C. JOSEPH.
FASTENER.
APPLICATION FILED DEC. 17, 1909.
1,050,279.
Patented Jan. 14, 1913.
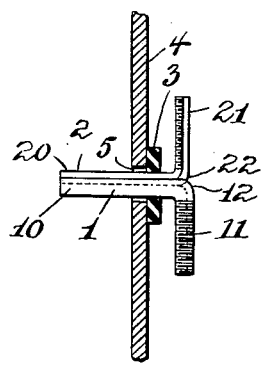
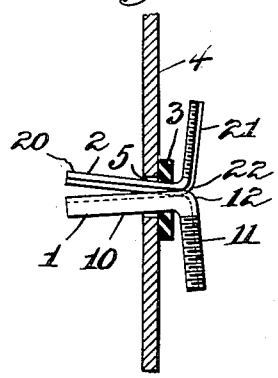
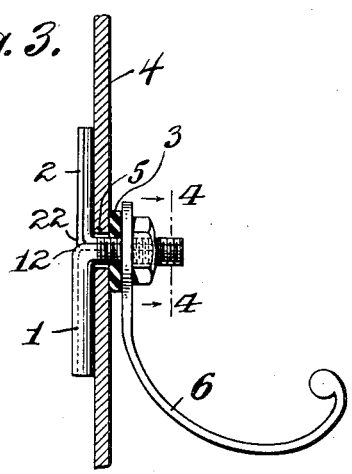
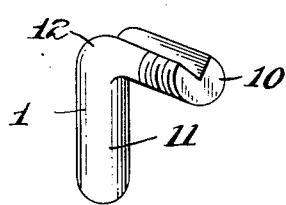
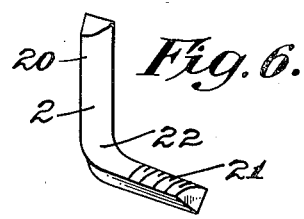
Attest:
Daisy Westervelt.
Alan C. McDonnell
Carl Joseph, Inventor:
by William R. Baird
his Atty.

UNITED STATES PATENT OFFICE.

CARL JOSEPH, OF BAYONNE, NEW JERSEY.

FASTENER.

1,050,279.          Specification of Letters Patent.     Patented Jan. 14, 1913.

Application filed December 17, 1909. Serial No. 533,545.

*To all whom it may concern:*

Be it known that I, CARL JOSEPH, a citizen of the German Empire, and resident of 612 Broadway, in the city of Bayonne, Hudson county, New Jersey, have invented certain new and useful Improvements in Fasteners, of which the following is a specification.

This invention relates to fasteners and its novelty consists in the construction and adaptation of the parts as will be more fully hereinafter pointed out.

In the drawings, Figure 1 represents a vertical section through a wall or partition and a side view of the parts of the fastener ready to be used to secure an article in position against the wall; Fig. 2 is a similar view showing an intermediate position of the parts of the fastener in the process of securing an article in place; Fig. 3 is a similar view showing the article secured in place; Fig. 4 is a transverse section on the plane of the line 4—4 in Fig. 3 showing the assembled parts of a preferred form of fastener in section and Figs. 5 and 6 are perspective views of the parts before assembly.

The fastener comprises two individual members 1 and 2 disposed at an angle to each other, preferably at a right angle and made of metal of peculiar cross sectional form. One member 1 has an inner arm 10 and an outer arm 11 and the other member 2 has an inner arm 20 and an outer arm 21. Each member is bent where the arms meet to form a bend or knuckle 12 in the one member and 22 in the other member. In cross section the member 2 is throughout its length preferably of the cross sectional shape of the quadrant of a circle and the member 1 is preferably of the cross sectional shape of three quadrants of a circle so that when the two members are assembled their united cross sectional area is that of a complete circle. In other words, it will be noted by reference to the drawings that one of the members 1 is circular in cross section with the exception of a longitudinal V-shaped slot that is substantially the quadrant of a circle and having flat walls that are substantially at right angles to each other. The other member 2 has a width equal to the widest portion of this slot. It has one side substantially V-shaped, while its other side has a curved face. The whole member constitutes in cross section a quadrant of a circle that will fill the longitudinal slot when the two members are assembled so as to produce a cross sectional configuration that is a complete circle, as illustrated in Fig. 4.

The arms 11 and 21 are preferably threaded after they are assembled but before use and the purpose of the peculiar form of the two members is to prevent a twisting movement of one member with respect to the other during such threading operation. A shallow longitudinal slot in the member 1 and a corresponding shallow fin or projection in the member 2 will not prevent such torsional movement and it has been found by experience that the most efficient means to prevent it is to have the lines of contact of the surfaces of the two members along radial planes disposed at an angle to each other so that when the torsional strain of cutting the thread is brought against the exterior surface of the members it is transmitted and resisted by a broad opposing surface. The planes of the depression in the member 1 and the corresponding planes of the outer surfaces of the member 2 need not necessarily be disposed at an angle of ninety degrees. This angle may be less, but it can not very well be much greater without inducing a tendency to slip; and the angle selected is the one which experience has demonstrated is best for the purpose. This construction enables the two members to be assembled and threaded in a machine before bending to form the knuckle and avoids the expense of special dies and tools required in their manufacture when other forms are employed.

A tie member 3 preferably in the form of an elastic ring is placed over both members to temporarily hold them together after assembly and before use and also serves an important function during such use as will presently be pointed out.

In the drawings, 4 is a vertical wall having a suitable opening 5, and it is desired to secure to the outer surface of this wall an article as a bracket 6. In so doing, the arms 10 and 20 are brought together as shown in Fig. 1. They are held together without any trouble by means of the tie 3 and, thus constituting a single rod in effect, are readily inserted through the aperture 5. The tie 3 does not pass through the aperture but abuts against the outer surface of the wall. The two inner arms 10 and 20 are then rotated on the respective knuckles or bends 12 and 22 of each member, as shown in Fig. 2. In so doing the tie 3 is necessarily stretched as the distance between the outer surfaces of the arms 10 and 20 is greater during such rotation than before. This rotation continues until the outer arms 11 and 21 are in contact as shown in Fig. 3, the inner arms 10 and 20 having in the meantime been brought to bear against the inner flat surface of the wall or partition. The bracket 6, or other article, to be secured to the wall is then slipped over the combined arms 11 and 21 and a nut 7 can then readily be passed along the threaded cylinder formed by the assembled members 11 and 12 and secures the bracket firmly in position.

The V-shaped slot in the one member and the corresponding V-shaped projection in the other member serves to keep the members in alinement while they are being inserted in the wall and rotated, and the tie member 3 when the members have been rotated on their knuckles into the position shown in Fig. 3 prevents the arms 11 and 21 from slipping through the aperture 5 and being lost behind the wall. When the bracket 6 and nut 7 is in place this tie member is tightly compressed against the wall and serves to seal such aperture and to form a packing between the wall and the bracket.

What I claim as new is:—

1. A fastener comprising two members, each bent at an angle to form a knuckle, one member having a cross sectionally curved outer face and a longitudinal substantially V-shaped slot in one side, and the other member having a width substantially equal to that of the slot, said other member having a substantially V-shaped side that engages in the slot and having an opposite curved side that projects above the same, whereby the two members when assembled may be threaded as a whole without torsional displacement.

2. A fastener comprising two members each bent at an angle to form a knuckle, one member being substantially circular in cross section and provided with a quadrantal V-shaped longitudinal slot throughout its length, and the other member having a cross sectional area corresponding to and adapted to be seated in the said slot and having a curved outer face that forms with the first mentioned member, a complete cross sectional circle, said members when assembled being threaded as a whole along their lengths on one side of the knuckle.

3. A fastener comprising two members each being externally cylindrical in form, one member having a longitudinal slot determined by radial planes substantially at right angles to each other and the other member having a corresponding longitudinal projection adapted to fit snugly in said slot, said members when assembled forming in cross section a complete circle and being threaded.

Witness my hand this 2nd day of December, 1909, at New York, N. Y.

CARL JOSEPH.

Witnesses:
SARA G. O'ROURKE,
DAISY WESTERVELT.